3,692,675
INHIBITOR TO CORROSIVE ATTACK AND METHOD OF USE
Kenneth H. Nimerick, Tulsa, Okla., assignor to The Dow Chemical Company, Midland, Mich.
No Drawing. Continuation-in-part of application Ser. No. 36,464, May 11, 1970. This application Nov. 4, 1970, Ser. No. 86,951
Int. Cl. C23f 11/12, 11/14
U.S. Cl. 252—8.55 E        16 Claims

ABSTRACT OF THE DISCLOSURE

A composition of matter which is useful for protecting metal exposed to a corrosive environment and use thereof in the treatment of metal parts, e.g. located in well bores, equipment, etc., is disclosed and claimed. The composition contains as an essential constituent an acid salt of the reaction product of (a) a fatty or resin acid, (b) a polymerized higher fatty acid, (c) a partial ester formed by reacting a polyhydric alcohol with a polymerized higher fatty acid and (d) aminoethyl ethanolamine.

CROSS REFERENCE TO RELATED APPLICATION

The present application is a continuation-in-part of patent application Ser. No. 36,464 filed May 11, 1970, now abandoned.

BACKGROUND OF THE INVENTION

The invention meets a need for improved inhibition of corrosion of metal parts caused by contact of such parts by a corrosive fluid, containing at least $H_2S$, $CO_2$ certain organic acids or mixtures thereof.

Metal parts, for example, the interior of tanks, mixers, coils and of various types of conduits and containers (hereinafter called vessels) and packers, pumps, valves and moving or moveable equipment (hereinafter called working parts) through which such corrosive fluid passes or which it contacts must be protected or else the length of service of the vessel or working part is markedly lessened. The type of protection which has been proven to be effective is that afforded by a chemical composition which is admixed with a treating fluid which is flushed through a vessel or system and/or admixed with the corrosive fluid being stored or periodically with such liquid being transferred.

Heretofore, although progress has been made in an improved protective composition and techniques to attain the objective of inhibiting the corrosive attack, the need has not been adequately met. Known inhibitors have displayed one or more defects among which have been: limited solubility in treatment fluids, especially in aqueous-base fluids, e.g. brines; the formation of tight or hard-to-break emulsions with petroleum liquids; incompatibility with certain types of scale inhibitors, bactericides, or known or readily available surfactants which are often desirably admixed with the corrosion inhibiting composition; and inadequate protection under severe corrosive conditions, e.g. at elevated temperatures and the like.

A particular need for improved protection against the corrosion of metal continues to exist in wells penetrating geologic formations including gas, oil, brine and water wells. In water wells the paucity of an effective nontoxic, water-soluble inhibitor has become critical.

SUMMARY OF THE INVENTION

The invention concerns a novel compound and a water-soluble, brine-dispersible corrosion inhibitor composition which forms a tenaciously adhering film on metal surfaces when such surfaces are treated by either batch and/or continuous types of application. The composition contains as an essential constituent an acid salt of the reaction product produced in accordance with the methods taught and claimed in U.S. Pat. No. 3,378,488. The persistent protection afforded by the use of this composition is unique. It is especially effective against $H_2S$ and $CO_2$-induced corrosivity. Its use is economical because of its excellent performance at a relatively low concentration of as low as 1000 p.p.m. or lower. It is also compatible with anionic scale inhibitors and bactericides and may be employed in liquid hydrocarbon and/or aqueous vehicles. Furthermore, the inhibitor has a low emulsifying tendency in oil or water.

PREFERRED EMBODIMENTS OF THE INVENTION

The novel composition of matter is prepared by reacting the reaction product (hereinafter referred to as Component A) prepared by reacting at a temperature between about 300° F. and 550° F. a mixture comprising to make a total of 100% by weight of:

(1) Between about 20% and about 60% of a monocarboxylic acid selected from the class of fatty acids and rosin acids and having from about 10 to about 24 carbon atoms per molecule; (2) between about 8% and 40% of a polymerized acid consisting essentially of dimerized unsaturated monocarboxylic fatty acids having from about 10 to about 24 carbon atoms per repeating unit; (3) between about 7% and about 36% of a reaction mixture comprising a partial ester formed by reacting, at above esterification temperature, a mixture consisting of between 0.6 and 1.4 molar ratio of each of (a) a polyhydroxy compound selected from the class consisting of alkylene glycols having from 2 to 5 carbon atoms per molecule and glycerol and (b) a polymerized monocarboxylic acid consisting essentially of dimerized unsaturated fatty acids having from about 10 to about 24 carbon atoms per repeating unit until esterification has proceeded to between about 45% and 65% of completion, and unreacted polyhydroxy compound and acid, and (4) between about 16% and about 30% of aminoethylethanolamine, with an inorganic or $C_1$–$C_6$ carboxylic acid or mixture thereof (hereinafter referred to as Component B) in a liquid vehicle (hereinafter referred to as Component C).

Component A is the product of the reaction taught and claimed in U.S. Pat. No. 3,378,488, the teachings thereof being specifically incorporated herein by reference. Specifically reference is made to the teachings found at column 2, line 17 through column 10, line 64 of the indicated patent for a description of the composition of Component A and its preparation. That patent indicates that the composition of Component A is useful as an inhibitor when dispersed in a hydrocarbon carrier liquid. It has been found that a novel salt of the composition can be prepared which is water and brine dispersible and is useful as a corrosion inhibitor.

Component B may be selected from any inorganic or carboxylic acid having a solubility of at least 1 gram per 100 grams of water or brine at ambient temperature. Preferably monocarboxylic acids or polycarboxylic acids are employed. Most preferably monocarboxylic acids are used. The carboxylic acids employed may be any one of or mixture of for example: formic, acetic, acrylic, propionic, n-butyric, glycolic, butyric, isobutyric, n-valeric or salicylic. The greater insolubility of the isobutyric and $C_6$ acids in water, however, tend to favor the use of the $C_1$ to $C_3$ and n-butyric acids.

Inorganic acids which may be used include, for example, chromic, nitric, hydrobromic, phosphoric, sulfamic, hydrochloric and the like.

Component C may be any one or more of water (including a brine), an alcohol, a liquid hydrocarbon. Preferably a dispersant (surface active agent) is also employed in the carrier liquid to aid in dispersing the other components therein. When aqueous based carrier liquids are employed the alcohol should be miscible therewith. Liquid hydrocarbons include, for example, paraffinic oils, e.g. kerosene, aromatic oils and the like, which may include an alcohol which is miscible therewith.

The above-defined novel compound (the reaction of Component A and B in a carrier liquid C) finds particular utility as an aqueous dispersible corrosion inhibitor for metals which come into contact with a corrosive fluid (gas or liquid) containing as corrosive ingredient at least one of $H_2S$, $CO_2$ or organic acid such as propionic and other similar low molecular weight fatty acids.

The novel corrosion inhibitor composition of the present invention is prepared by admixing together, as percent by weight, about 1 to about 50 percent of (1) an active inhibitor ingredient, said ingredient comprising from about 1 to about 100 percent of Component A and 0 to 99 percent of an imidazoline inhibitor (hereinafter referred to as Component D); (2) Component B in an amount sufficient to provide a pH ranging from about 5.5 to about 7.5 and (3) Component C to make up the balance.

Optionally, the composition of the invention may also contain up to 35% by weight of a $C_1$ to $C_4$ monohydroxy alcohol (Component E) as an aid to dissolution, dispersion and lowering of the pour point of the composition. The alcohol may be added to the formulation at any time during or following its preparation.

A bactericide (Component F) may also be employed in the composition of the invention. Among such bactericides especially recommended are the chlorinated phenols, e.g. 2,4,5-trichlorophenol; 2,4,6-trichlorophenol; 2-chloro-4-phenylphenol; 4-chloro - 2 - cyclopentylphenol, and the like, and sodium salts thereof. This type of bactericide is commercially available under the trademark Dowicide. Up to about 6% by weight of the bactericide is compatible with the inhibitor formulation. The amount of bactericide employed depends upon the needs of the particular treatment. As little as 10 parts per million in the fluid contacting the metal have been found helpful. However, at least 20 parts per million and preferably at least 100 parts per million are recommended. It is not seen that an amount in excess of 2% by weight and certainly not over 5% by weight of the total inhibitor composition would be justified from an economic standpoint.

A surface active agent (Component G), called herein a surfactant, preferably of the non-ionic or the amphoteric type may also be incorporated with formulation. It is required to be present in an amount of between about 0.2% and 6.0% by weight when alcohol or water is employed as the vehicle. Any non-ionic surfactant having an hydrophile-lipophile balance of between about 8 and about 18 is acceptable. Illustrative of surfactants to use in the practice of the invention are: ethylene oxide-phenol adducts, e.g. those prepared by reacting from about 8 to about 15 molar weight of ethylene oxide with one molar weight of phenol or a substituted phenol, e.g. nonyl phenol. Other surfactants acceptable for use herein are well known to those skilled in the art and are listed, for example, in the publication Detergent and Emulsifiers, 1965 Annual prepared by John W. McCutheon, Inc.

An inhibitor to scale formation (Component H) may also be employed in the composition. A reactive mixture of ammonia, an aldehyde or ketone, and a dialkylphosphite to produce the ester and which is thereafter hydrolyzed, is one type which can be used. The resulting product (Component H) is best described as an amino lower alkylidenephosphonic acid of which nitrilotrimethylenephosphonic acid or the sodium salt thereof are the preferred examples. This component is described in U.S. Pat. No. 3,234,124 and particularly defined in claim 1 thereof, or as modified and described in U.S. Pat. No. 3,299,123, particularly as defined in claim 1 thereof. Component H is compatible up to at least equal parts with the active inhibitor ingredient. These teachings are specifically incorporated herein by reference.

Although the scale inhibitor (Component H) is not essential to the practice of the invention, its use will prevent scale deposition of $CaCO_3$, $BaSO_4$, $CaSO_4$, etc. and allow the film-forming corrosion inhibitor formed by the reaction of Components A and B to form directly on the metal to be protected. Component H can be employed in an amount ranging from about 0.001 to about 25 percent by weight of the composition. Usually, when Component H is used, substantially equal amounts of Components A and H are employed. More Component H may be employed but is impractical. Any amount of Component H may be used with Component A observing the recommended maximum amount thereof and the total of both, as set out hereinbefore.

As indicated, the composition may optionally include an imidazoline type corrosion inhibitor (Component D). Component D aids in preventing $H_2S$ and $CO_2$ corrosion of metals when employed in low concentrations and is also highly surface active thus aiding in dispersing Component A in the liquid vehicle. Component D is preferably employed in an amount up to the amount of Component A present but as indicated it is preferred that the total amount of Components A and D make up no more than about 50 percent by weight of the inhibitor composition. Examples of suitable imidazoline compounds are compounds containing the characteristic imidazolyl

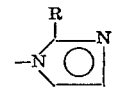

moiety wherein R normally represents a long chain organic group containing at least about 10 carbon atoms, normally a $C_{18}$ group. For a further description of different imidazolines which are useful as corrosion inhibitors in sour and swell wells reference may be made to Bregman, Corrosion Inhibitors, pp. 201–202 (1963). Examples of relatively common imidazolines are

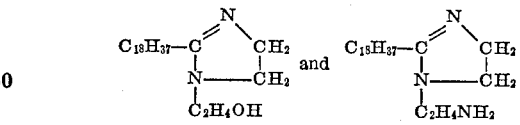

Patents which describe other imidazolines and methods of preparing the same include, for example, U.S. Pat. Nos. 2,940,927; 2,773,879; 2,668,100; 2,724,695; 2,727,003; 2,865,358; 2,895,961; 2,877,179; 2,865,856; 2,851,415; 2,793,997; 2,846,440; 2,889,277; 2,924,571; 2,905,644; 2,868,727; 3,488,701 and 3,488,294.

A preferred inhibitor composition of the present invention comprises the formulation which is formed by admixing together from about 5 to about 50 percent of Component A with from about 0.1 to about 6 percent of a $C_1$ to $C_6$ carboxylic acid as Component B and the balance Component C. Other compositions are prepared by mixing together the constituents listed in the following recipes:

RECIPE 1

| Component: | Percent by weight |
|---|---|
| A | 5 to 25 |
| B | 1 to 5 |
| D | 5 to 25 |
| E—1 to 4 carbon monoalcohol | 1 to 35 |
| C to make 100%. | |

RECIPE 2

| Component: | Percent by weight |
|---|---|
| A | 5 to 25 |
| B | 1 to 5 |
| D | 5 to 25 |
| E | 1 to 25 |
| G—Ethylene oxide-phenol adduct | 0.5 to 5 |
| C to make 100%. | |

RECIPE 3

| Component: | Percent by weight |
|---|---|
| A | 5 to 25 |
| B | 1 to 5 |
| D | 5 to 25 |
| E | 1 to 25 |
| G—nonionic surfactant | 0.2 to 6.0 |
| C to make 100%. | |

The order of mixing the ingredients of the inhibitor composition is not critical. Usually the esterified secondary amide (Component A), prepared in accordance with U.S. Pat. No. 3,378,488, (and Component D if desired) is admixed with Component C, e.g., an alcohol, water, or kerosene and a surfactant or a mixture of alcohol and water or kerosene and then the selected carboxylic acid or inorganic acid, (Component B) is admixed therewith. Mixing is usually facilitated by admixing a small amount of a water-miscible alcohol (Component E), e.g., isopropyl alcohol, with the water or hydrocarbon liquid prior to admixing Components A and B. Mixing is usually continued for at least ½ hour preferably 1½ to 2 hours.

The following order of addition is very often used:

A proper amount of water (Component C) is weighed out into a suitable size container. To the water is then admixed the amount of acid (Component B) desired. Thereafter, when an alcohol is used, it is admixed therewith. Then, if being employed, Component D is admixed therewith followed by Component A. If desired Components A and B may be premixed and then admixed with the other constituents. Usually mixing takes at least an hour or sometimes possibly an hour and a half or two hours. When the surfactant (Component G) is employed it is often admixed with the kerosene or water. However, the surfactant may be added at any time during blending. It is suggested that mixing not be done at advanced temperatures of over 200° F.

The inhibitor composition can be employed to inhibit the corrosion of steel, iron and other similar metals and ferrous alloys thereof.

The following examples will facilitate a more complete understanding of the invention. It is understood that the examples are included for illustrative purposes only and the invention is not to be construed as limited to the specific embodiments incorporated therein.

Example 1

In the following examples (unless otherwise noted) 5-mil (0.005 inch) thick steel shimstock coupons (Stock No. S–50), 6 inches long and 0.5 inch wide, were employed to test the effectiveness of formulations as corrosion inhibitors. Each coupon was cleaned and weighed prior to being used in a test run. The testing procedure employed in this example is referred to as a filming test. The test procedure consisted of 3 stages: filming, rinsing and corroding. First (filming stage) the coupons were immersed in a corrosive fluid containing a specified amount of an inhibitor formulation (filming fluid). For adequate contact the coupons were placed on a revolving wheel. The temperature of the wheel was maintained at about 175–180° F. and the coupons were contacted with the filming fluid for one hour. To serve as a control, several coupons were contacted with a similar corrosive fluid which did not contain any inhibitor formulation.

Next (rinsing stage), the coupons were removed from the filming fluid and transferred to a second container where they were rinsed in a similar corrosive fluid (rinsing fluid) which did not contain an inhibitor. They were rinsed in the fluid while maintained at a temperature ranging from about 175°–180° F. for about an hour.

Finally (corroding stage), the coupons were transferred and immersed in a third corrosive fluid which did not contain an inhibitor formulation (corroding fluid) and rotated therein at a speed of about 33 r.p.m. at a temperature of about 175°–180° F. for about 16–18 hours.

Following the corroding stage the coupons were removed from the corrosive fluid, cleaned, dried and reweighed.

The extent of protection provided by the inhibitor formulation tested is calculated in accordance with the following formula:

$$100 - \left[\frac{\text{weight loss of treated coupon in test}}{\text{average weight loss of controls}} \times 100\right]$$

= percent protection (to the nearest whole percent)

The controls for certain sets of test data immediately precede the test data in the tables.

The corrosive fluid employed in the tests consisted of either a mixture of 90% of a brine and 10% of kerosene or 100 percent of the brine. The brine consisted of an aqueous solution containing 10% NaCl, 0.5% $CaCl_2$, 0.08% acetic acid, and saturated with $H_2S$. The kerosene was also saturated with $H_2S$. Except in Test Nos. 10–27 the filming fluid, rinsing fluid and corroding fluid consisted of a mixture of 90% brine and 10% kerosene. In tests 10 to 18 the filming fluid consisted of 100 percent brine while the rinsing and corroding fluid consisted of the mixture. In tests 19 to 27 all three of the fluids consisted of 100% brine.

The inhibitor formulations employed are set forth in the following Table I. Component A consisted essentially of a product produced in accordance with Example 1 of U.S. Pat. No. 3,378,488. In all the tests Component C consisted of water unless others were noted. Component D was an imidazoline compound prepared by reacting about 1 mole of aminoethyl ethanolamine with ¾ equivalent tall oil, ¼ equivalent of Empol 1022 (defined at column 2, line 68 to column 3, line 3 of U.S. Pat. 3,378,488) at a temperature of about 500° C. until two moles of water are removed from the reaction mixture. Component E consisted of isopropyl alcohol, and Component G consisted of an alkyl phenol ether of polyethylene glycol unless otherwise noted.

TABLE I

Formulation No. 1

| Component: | Percent by weight |
|---|---|
| A | 12.5 |
| B propionic acid | 3.0 |
| C | 43.0 |
| D | 12.5 |
| E | 25.0 |
| G | 4.0 |

Formulation No. 2 (a commercially available inhibitor)

| Component: | Percent by weight |
|---|---|
| A | none |
| B acetic acid | 3.8 |
| C | 50.2 |
| D | 24.9 |
| E | 20.0 |
| G | 1.1 |

Formulation No. 3

| Component: | Percent by weight |
|---|---|
| A | 12.0 |
| B acetic acid | 2.0 |
| C | 52.0 |
| D | 12.0 |
| E | 20.0 |
| G | 2.0 |

Formulation No. 4

| Component: | Percent by weight |
|---|---|
| A | 1.0 |
| B propionic acid | 3.5 |
| C | 42.5 |
| D | 24.0 |
| E | 25.0 |
| G | 4.0 |

Formulation No. 5

| Component: | Percent by weight |
|---|---|
| A | 5.0 |
| B propionic acid | 3.0 |
| C | 43.0 |
| D | 20.0 |
| E | 25.0 |
| G | 4.0 |

Formulation No. 6

| Component: | Percent by weight |
|---|---|
| A | 12.5 |
| B glycolic acid | 3.0 |
| C | 43.0 |
| D | 12.5 |
| E | 25.0 |
| G | 4.0 |

Formulation No. 7

| Component: | Percent by weight |
|---|---|
| A | 12.5 |
| B butyric acid | 3.0 |
| C | 43.0 |
| D | 12.5 |
| E | 25.0 |
| G | 4.0 |

Formulation No. 8

| Component: | Percent by weight |
|---|---|
| A | 12.5 |
| B acrylic acid | 3.0 |
| C | 44.0 |
| D | 12.5 |
| E | 25.0 |
| G | 3.0 |

Formulation No. 9

| Component: | Percent by weight |
|---|---|
| A | 15 |
| B | |
| C kerosene | 59.5 |
| D | 15 |
| E | 10 |
| G | [1] 0.5 |

[1] Essentially a mixture of a cationic amine and ethoxylated 2,3-butylene glycol.

Formulation No. 10

| Component: | Percent by weight |
|---|---|
| A | 15 |
| B glycolic acid | 4 |
| C | 46.0 |
| D | 15 |
| E | 20.0 |
| G | |

Formulation No. 11

| Component: | Percent by weight |
|---|---|
| A | 15.0 |
| B glycolic acid | 4.0 |
| C | 46.0 |
| D | 15.0 |
| E | 20.0 |

G—1 ml./100 mls. of formulation.

Formulation No. 12

| Component: | Percent by weight |
|---|---|
| A | 15.0 |
| B glycolic acid | 4.0 |
| C | 46.0 |
| D | 15.0 |
| E | 20 |

G surfactant having the formula—3 mls./100 mls. of formulation.

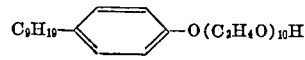

Formulation No. 13

| Component: | Percent by weight |
|---|---|
| A | 30.0 |
| B glycolic acid | 4.0 |
| C | 46 |
| D | |
| E | 20.0 |

G—3 mils./100 mls. of formulation.

Formulation No. 14

| Component: | Percent by weight |
|---|---|
| A | 30.0 |
| B acetic acid | 1.6 |
| C | 48.4 |
| D | |
| E | 20.0 |

G surfactant having the formula—1 ml./100 mls. of formulation.

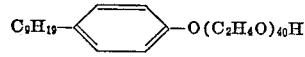

The results of the tests are set forth in the following Table II.

TABLE II

| Test No. | Inhibitor formulation | Conc. of inhibitor formulation in parts per million (p.p.m.) | Wt. loss in milligrams (mg.) | Percent protection |
|---|---|---|---|---|
| 1 | None | [1] 0 | 157.5 | |
| 2 | do | [1] 0 | 160.0 | |
| 3 | Formulation No. 1 | 10,000 | 5.8 | 97 |
| 4 | do | 10,000 | 6.8 | 96 |
| 5 | do | 25,000 | 5.7 | 97 |
| 6 | do | 25,000 | 6.7 | 96 |
| 7 | do | 50,000 | 4.0 | 98 |
| 8 | do | 50,000 | 5.0 | 97 |
| 9 | do | 100,000 | 4.0 | 98 |
| 10 | None | [1] 0 | 174.2 | |
| 11 | do | [1] 0 | 177.7 | |
| 12 | Formulation No. 1 | 10,000 | 25.7 | 84 |
| 13 | do | 10,000 | 5.9 | 97 |
| 14 | do | 25,000 | 5.4 | 97 |
| 15 | do | 25,000 | 5.2 | 97 |
| 16 | do | 50,000 | 4.8 | 97 |
| 17 | do | 50,000 | 5.0 | 97 |
| 18 | do | 100,000 | 25.0 | 86 |
| 19 | None | [1] 0 | 149.8 | |
| 20 | do | [1] 0 | 145.4 | |
| 21 | Formulation No. 1 | 10,000 | 17.0 | 89 |
| 22 | do | 10,000 | 24.0 | 84 |
| 23 | do | 25,000 | 18.2 | 88 |
| 24 | do | 25,000 | 15.3 | 90 |
| 25 | do | 50,000 | 17.4 | 89 |
| 26 | do | 50,000 | 17.4 | 89 |
| 27 | do | 100,000 | 21.5 | 86 |
| 28 | None | [1] 0 | 143.9 | |
| 29 | do | [1] 0 | 156.8 | |
| 30 | Formulation No. 2 | 10,000 | 134.1 | 10 |
| 31 | do | 25,000 | 93.3 | 40 |
| 32 | do | 50,000 | 137.4 | 9 |
| 33 | Formulation No. 3 | 10,000 | 12.1 | 93 |
| 34 | do | 25,000 | 7.5 | 95 |
| 35 | do | 50,000 | 6.0 | 96 |
| 36 | Formulation No. 4 | 10,000 | 178.0 | 7 |
| 37 | do | 25,000 | 27.3 | 86 |
| 38 | do | 50,000 | 150.5 | 21 |
| 39 | do | 100,000 | 4.3 | 98 |
| 40 | Formulation No. 5 | 10,000 | 74.2 | 61 |
| 41 | do | 25,000 | 26.8 | 86 |
| 42 | do | 50,000 | 26.0 | 86 |
| 43 | do | 100,000 | 5.5 | 97 |
| 44 | None | [1] 0 | 150.0 | |
| 45 | do | [1] 0 | 150.0 | |
| 46 | do | [1] 0 | 156.0 | |
| 47 | Formulation No. 6 | 5,000 | 88.5 | 42 |
| 48 | do | 5,000 | 64.9 | 57 |
| 49 | do | 10,000 | 27.7 | 82 |

See footnote at end of table.

TABLE II—Continued

| Test No. | Inhibitor formulation | Conc. of inhibitor formulation in parts per million (p.p.m.) | Wt. loss in milligrams (mg.) | Percent protection |
|---|---|---|---|---|
| 50 | do | 10,000 | 21.8 | 86 |
| 51 | do | 25,000 | 3.5 | 98 |
| 52 | do | 25,000 | 4.3 | 98 |
| 53 | do | 50,000 | 5.0 | 97 |
| 54 | Formulation No. 7 | 5,000 | 37.2 | 76 |
| 55 | do | 5,000 | 41.0 | 73 |
| 56 | do | 10,000 | 5.5 | 97 |
| 57 | do | 10,000 | 6.0 | 96 |
| 58 | do | 25,000 | 3.8 | 98 |
| 59 | do | 25,000 | 4.5 | 97 |
| 60 | do | 50,000 | 5.0 | 97 |
| 61 | None | [1] 0 | 203.3 | |
| 62 | do | [1] 0 | 194.0 | |
| 63 | do | [1] 0 | 175.0 | |
| 64 | Formulation No. 8 | 10,000 | 17.0 | 91 |
| 65 | do | 10,000 | 30.0 | 81 |
| 66 | do | 25,000 | 3.8 | 98 |
| 67 | do | 25,000 | 7.2 | 96 |
| 68 | do | 50,000 | 4.0 | 98 |
| 69 | do | 50,000 | 5.0 | 98 |
| 70 | None | [1] 0 | 115.3 | |
| 71 | do | [1] 0 | 119.0 | |
| 72 | do | [1] 0 | 112.4 | |
| 73 | Formulation No. 9 | 2,000 | 108.6 | 10 |
| 74 | do | 2,000 | 98.6 | 19 |
| 75 | do | 5,000 | 37.6 | 69 |
| 76 | do | 5,000 | 14.4 | 88 |
| 77 | do | 10,000 | 6.1 | 95 |
| 78 | do | 10,000 | 6.3 | 95 |
| 79 | do | 50,000 | 6.6 | 95 |
| 80 | do | 50,000 | 5.2 | 96 |
| 81 | Formulation No. 10 | 2,000 | 105.3 | 10 |
| 82 | do | 2,000 | 98.7 | 19 |
| 83 | do | 5,000 | 6.7 | 95 |
| 84 | do | 5,000 | 16.7 | 87 |
| 85 | do | 10,000 | 6.0 | 95 |
| 86 | do | 10,000 | 5.7 | 95 |
| 87 | do | 50,000 | 5.5 | 96 |
| 88 | do | 50,000 | 5.4 | 96 |
| 89 | Formulation No. 11 | 2,000 | 10.7 | 12 |
| 90 | do | 2,000 | 88.5 | 27 |
| 91 | do | 5,000 | 13.5 | 89 |
| 92 | do | 5,000 | 8.7 | 93 |
| 93 | do | 10,000 | 8.6 | 93 |
| 94 | do | 10,000 | 7.8 | 94 |
| 95 | do | 50,000 | 8.5 | 93 |
| 96 | do | 50,000 | 6.5 | 95 |
| 97 | Formulation No. 12 | 2,000 | 110.0 | 10 |
| 98 | do | 2,000 | 103.0 | 10 |
| 99 | do | 5,000 | 40.8 | 77 |
| 100 | do | 5,000 | 48.3 | 60 |
| 101 | do | 10,000 | 7.7 | 94 |
| 102 | do | 10,000 | 8.9 | 93 |
| 103 | do | 50,000 | 6.0 | 95 |
| 104 | do | 50,000 | 6.6 | 95 |
| 105 | Formulation No. 13 | 2,000 | 38.6 | 68 |
| 106 | do | 2,000 | 9.4 | 92 |
| 107 | do | 5,000 | 5.2 | 96 |
| 108 | do | 5,000 | 5.9 | 95 |
| 109 | do | 10,000 | 13.4 | 89 |
| 110 | do | 10,000 | 11.8 | 90 |
| 111 | do | 50,000 | 27.4 | 78 |
| 112 | do | 50,000 | 31.6 | 74 |
| 113 | Formulation No. 14 | 5,000 | 13.4 | 94 |
| 114 | do | 10,000 | 11.1 | 95 |
| 115 | do | 25,000 | 14.8 | 94 |
| 116 | do | 50,000 | 10.9 | 95 |

[1] Control.

Tests Nos. 30–32 and 36–43 show the necessity of having an effective amount of Component A to provide film persistency.

Example 2

As indicated hereinbefore the inhibitor composition of the present invention is effective for use in both film and batch (continuous) types of application. This example illustrates the effectiveness of the inhibitor in a continuous type application. Coupons, as described in Example 1, were exposed to a corrosive fluid of 90% brine, 10% kerosene having the characteristics set forth in Example 1 and which contained various amounts of an inhibitor composition. The coupons were rotated on a wheel in the corrosive fluid for about 16 hours at a temperature of about 175–180° F. The weight loss and percent protection were determined in the same manner as described in Example 1. The inhibitor formulations correspond to Formulation Nos. 1, 6 and 7 set forth in Example 1, Table I.

The results of the tests are set forth in the following Table III. These results show the excellent protection afforded by the novel inhibitor at concentrations as low as 10 p.p.m.

TABLE III

| Test No. | Inhibitor formulation | Conc. of inhibitor (p.p.m.) | Wt. loss (mg.) | Percent protection |
|---|---|---|---|---|
| 1 | None | [1] 0 | 141.0 | |
| 2 | do | [1] 0 | 148.8 | |
| 3 | do | [1] 0 | 141.1 | |
| 4 | Formulation No. 6 | 10 | 28.7 | 80 |
| 5 | do | 10 | 31.8 | 78 |
| 6 | do | 25 | 10.9 | 93 |
| 7 | do | 25 | 6.0 | 96 |
| 8 | do | 50 | 3.3 | 98 |
| 9 | do | 50 | 5.0 | 97 |
| 10 | do | 100 | 3.0 | 97 |
| 11 | Formulation No. 1 | 10 | 35.5 | 75 |
| 12 | do | 10 | 32.8 | 76 |
| 13 | do | 25 | 5.7 | 96 |
| 14 | do | 25 | 21.5 | 85 |
| 15 | do | 50 | 3.0 | 98 |
| 16 | do | 50 | 4.0 | 98 |
| 17 | do | 100 | 4.0 | 98 |
| 18 | Formulation No. 7 | 10 | 32.0 | 78 |
| 19 | do | 10 | 22.1 | 85 |
| 20 | do | 25 | 3.8 | 98 |
| 21 | do | 25 | 22.8 | 84 |
| 22 | do | 50 | 3.7 | 98 |
| 23 | do | 50 | 4.0 | 98 |
| 24 | do | 100 | 4.0 | 98 |

[1] Control.

Example 3

The inhibitor formulations of the present invention have an advantage in that they are compatible with anionic scale inhibitors and bactericides. A certain amount of a scale inhibitor was employed with the Formulation No. 1 (set forth in Example 1, Table I) and the effectiveness against corrosion attack was determined by both the procedure employed in Example 1 and the procedure employed in Example 2. The results of these tests are set forth in the following Table IV. In tests 11–17 and 29–36 the scale inhibitor consisted essentially of nitrile trimethylene phosphonic acid as the active ingredient in soluton in water, sodium hydroxide and methyl alcohol. Test Nos. 1–17 were run according to the procedure defined in Example 1. Test Nos. 18–36 were run according to the procedure defined in Example 2.

TABLE IV

| Test No. | Conc. of inhibitor (p.p.m.) | Conc. of scale inhibitor (p.p.m.) | Weight loss (mg.) | Percent protection |
|---|---|---|---|---|
| 1 | [1] 0 | | 174.0 | |
| 2 | [1] 0 | | 147.4 | |
| 3 | [1] 0 | | 162.8 | |
| 4 | 5,000 | | 20.8 | 88 |
| 5 | 5,000 | | 20.8 | 88 |
| 6 | 10,000 | | 4.5 | 97 |
| 7 | 10,000 | | 5.2 | 97 |
| 8 | 25,000 | | 3.8 | 98 |
| 9 | 25,000 | | 4.2 | 98 |
| 10 | 50,000 | | 4.0 | 98 |
| 11 | 5,000 | 20 | 22.0 | 87 |
| 12 | 5,000 | 20 | 19.0 | 88 |
| 13 | 10,000 | 20 | 4.7 | 97 |
| 14 | 10,000 | 20 | 4.8 | 97 |
| 15 | 25,000 | 20 | 4.9 | 97 |
| 16 | 25,000 | 20 | 4.7 | 97 |
| 17 | 50,000 | 20 | 3.7 | 98 |
| 18 | [1] 0 | | 177.5 | |
| 19 | [1] 0 | | 206.0 | |
| 20 | [1] 0 | | 201.0 | |
| 21 | 10 | | 32.5 | 83 |
| 22 | 10 | | 31.6 | 83 |
| 23 | 25 | | 29.8 | 85 |
| 24 | 25 | | 12.5 | 94 |
| 25 | 50 | | 5.2 | 97 |
| 26 | 50 | | 4.5 | 98 |
| 27 | 100 | | 4.5 | 98 |
| 28 | 100 | | 5.3 | 97 |
| 29 | 10 | 20 | 59.5 | 70 |
| 30 | 10 | 20 | 47.6 | 76 |
| 31 | 25 | 20 | 36.0 | 82 |
| 32 | 25 | 20 | 31.5 | 84 |
| 33 | 50 | 20 | 5.8 | 97 |
| 34 | 50 | 20 | 4.2 | 98 |
| 35 | 100 | 20 | 5.0 | 98 |
| 36 | 100 | 20 | 4.7 | 98 |

[1] Control.

In addition, the effect of the inhibitor formulation on the efficiency of the scale inhibitor was tested. In this test 4 percent $Na_2SO_4$ and $CaCl_2$ solutions were poured together in equal volumes. The time it took for $CaSO_4$ crystals to form was determined. Without any scale inhibitor at all it took about 10 minutes for the crystals to start to grow. When about 20 p.p.m. of the corrosion inhibitor corresponding to Formulation No. 1 (Example 1, Table I) and about 10 p.p.m. of the scale inhibitor described directly hereinbefore was included there was no crystal growth even after 3 hours.

In still another test the dispersibility of Formulation No. 1 (Example 1, Table I) with a scale inhibitor in $H_2O$ was determined. In this test a dispersion of 4 parts $H_2O$, 2 parts corrosion inhibitor and 2 parts scale inhibitor were still in a stable dispersion four days after being mixed. Three and 6 parts $H_2O$ showed similar results as did a mixture of 98 parts $H_2O$ and 1 part each of the corrosion inhibitor and the scale inhibitor.

As indicated the inhibitor compositions of this invention are normally stable with anionic bactericides when admixed with a corrosive fluid. To illustrate this property, various quantities of a bactericide composition consisting essentially of the sodium salt of pentachlorophenol as the active ingredient was admixed with an inhibitor composition corresponding to Formulation No. 1 (Example 1, Table I) and the systems observed for both dispersibility and bacteria inhibition.

The results of these tests are set forth in the following Table V.

of this example. One of these four wells was designated B–1 and was treated in accordance with the process of the invention. The other three wells of this group were treated in accordance with the best available commercial practice heretofore known.

Production from these four wells prior to treatment of B–1 and production from the three wells during treatment in accordance with conventional practice, proved almost impossible to continue due to excessive corrosion which resulted in repeated breaking of rods and other corrosion problems including repeated leaks. Furthermore, during previous operation and during the operation of the three wells not treated in accordance with the invention, there occurred what is known as a pump seizure or a freezing of the operating parts in these wells on about an average of once every six weeks as a result of which the operation completely stopped and the well had to be cleaned out before production could be resumed.

B–1 was treated according to the principles of the invention as follows:

First 10 gallons of the composition defined as Formulation No. 1 (Example 1, Table I) were dumped down the annulus and circulated in the well for four hours.

The following day 5 quarts of the same composition

TABLE V

| Test No. | Quantity of formulation No. 1 | Quantity of bactericide inhibitor | Fluid system | Physical appearance | Bacteria inhibition |
|---|---|---|---|---|---|
| 1 | 1 part | 1 part | None | Not compatible | |
| 2 | 1,000 p.p.m. | 1,000 p.p.m. | Fresh $H_2O$ | Soluble | |
| 3 | 1% | 1% | do | Stable dispersion | |
| 4 | 5% | 5% | do | do | |
| 5 | 10% | 10% | do | Initially dispersible precipitate formed within one hour. | |
| 6 | | | Anaerobic bacteria culture. | | Growth in 24 hours. |
| 7 | | | do | | Do. |
| 8 | | 50 p.p.m. | do | | Do. |
| 9 | 50 p.p.m. | 50 p.p.m. | do | | Do. |
| 10 | 50 p.p.m. | | do | | Do. |
| 11 | | 100 p.p.m. | do | | No growth in 24 hours. |
| 12 | 50 p.p.m. | 100 p.p.m. | do | | Do. |
| 13 | | 200 p.p.m. | do | | Do. |
| 14 | 20 p.p.m. | 200 p.p.m. | do | | Do. |

Example 4

The corrosion inhibitor composition of the present invention does not form stable oil-water emulsions. A mixture of 1 part kerosene, 1 part of brine and 1 percent of inhibitor Formulation No. 1 (Example 1, Table I) was stirred in a high speed blender for 30 seconds. There was a 95 percent phase separation in 1 minute. Likewise there were no emulsions formed during the corrosion tests described in the previous examples when employing as much as 10 percent of the composition of the present invention in a 90% brine 10% kerosene mixture. The product produced in accordance with the method described in U.S. Pat. 3,378,488 is oil dispersible.

Other water and brine solubility tests were run employing only Component A, i.e. the esterified secondary amide of the type described in claim 1 of U.S. Pat. 3,378,488 as the corrosion inhibitor, i.e. no acid (Component B) was present. In these tests, although up to 50% by weight of Component D was present, the results were all unsatisfactory thereby showing that the invention cannot be successfully practiced without the presence of both the esterified secondary amide and the acid. The fact that the invention was not successful without the acid even in the presence of both A and D, does not disprove the supplemental value of Component D, i.e. the corrosion inhibitor when both A and B are also present.

Example 5

Following is set forth a field example in accordance with the practice of the method of the invention. Four wells forming a group in what is known as the Homestake Flood field designated as the Varnum wells was the site were injected down the well and circulated for 0.5 hour. Thereafter the well was put back into production. Every three days thereafter for four consecutive treatments an additional 4 to 5 quarts of the composition were injected down the well and circulated for about 0.5 hour.

The B–1 well was thereafter continued to be treated twice each week using 3 quarts of the composition of the invention prepared as described above and the well circulated for ½ hour. Production of the well was continued during which it produced about 400 barrels of oil and water per day in a ratio of about 100 barrels of oil to 300 barrels of water. Other than a rod break at the very beginning of the treatment of B–1 (due to the weakening of the rod by the corrosive effects of the fluids prior to treatment in accordance with the invention) there were no more corrosion problems associated with the B–1 well.

In contrast thereto the three other wells continued to give almost insurmountable problems and difficulties almost daily so that production was extremely costly, unsatisfactory, and disappointing from these wells. Since the four wells were producing from the same formation and producing substantially the same oil and water fluid having the same high corrosivity, it was most rewarding to observe the results obtained after the treatment of the B–1 well. That well continued to produce without interruption (except for adding the few quarts of corrosion inhibitor) and is continuing to so produce after many months.

Example 6

A corrosion inhibitor composition containing the constituents as set forth in Formulation No. 1 (Example 1, Table I) was tested at an elevated temperature ranging from about 300 to about 325° F. The corrosive fluid consisted of an H₂S saturated brine as defined in Example 1 and kerosene, which was also saturated with H₂S. In this test, however, test cells of stainless steel were employed. Each cell was one inch in diameter and 10 inches long and could be closed at both ends.

Each test cell was filled with a 1% solution of the inhibitor composition in fresh water and allowed to stand for 30 minutes. The solution was removed and the cell was flushed with water (5 cell volumes) and then allowed to drip dry. Each cell was filled with 100 ml. of brine and 10 ml. of kerosene. This volume of fluid in the cell allowed for a 40 cc. gas space for expansion. Varying amounts of the inhibitor composition were added to the fluid containing cells. A preweighed coupon (cradled on each end with tetrafluoroethylene fluorocarbon resin to prevent metal-metal contact and galvanic corrosion) was placed in each cell. Each cell was then flushed with H₂S and capped.

The cells were placed in a 300–325° F. oil bath for 16 hours. At the completion of the 16 hours, the cells were removed from the bath, cooled to room temperature and opened. The coupons were removed and cleaned by placing them in an inhibited 15% HCl solution for approximately 10 minutes. Each coupon was then washed with a brush and water. The coupons were then placed in acetone and removed for drying and reweighing.

The results of the tests are set forth in the following Table VI.

TABLE VI

| Test number: | Conc. of inhibitor (p.p.m.) | Weight loss (mg.) | Percent protection |
|---|---|---|---|
| 1 | 0 | 132.9 | 0 |
| 2 | 0 | 182.4 | 0 |
| 3 | 0 | 145.3 | 0 |
| 4 | 0 | 121.6 | 0 |
| 5 | 0 | 120.0 | 0 |
| 6 | 0 | 96.2 | 0 |
| 7 | 0 | 73.5 | 0 |
| 8 | 0 | 122.2 | 0 |
| 9 | 0 | 89.9 | 0 |
| 10 | 0 | 119.3 | 0 |
| 11 | 50 | 90.2 | ¹ 8 |
| 12 | 50 | 24.8 | 75 |
| 13 | 100 | 14.0 | 91 |
| 14 | 100 | 29.8 | 81 |
| 15 | 100 | 86.5 | ¹ 44 |
| 16 | 100 | 25.9 | 77 |
| 17 | 100 | 28.4 | 75 |
| 18 | 100 | 32.3 | 72 |
| 19 | 100 | 19.2 | 81 |
| 20 | 100 | 16.4 | 84 |
| 21 | 100 | 44.8 | ¹ 58 |
| 22 | 100 | 84.8 | ¹ 19 |
| 23 | 175 | 24.1 | 77 |
| 24 | 175 | 17.2 | 88 |
| 25 | 250 | 11.5 | 89 |
| 26 | 250 | 15.0 | 85 |
| 27 | 250 | 10.0 | 91 |
| 28 | 250 | 13.5 | 88 |
| 29 | 500 | 11.4 | 89 |
| 30 | 500 | 11.9 | 89 |
| 31 | 1,000 | 16.9 | 89 |
| 32 | 1,000 | 26.6 | 85 |
| 33 | 1,000 | 18.4 | 88 |
| 34 | 1,000 | 20.6 | 82 |
| 35 | 1,000 | 11.7 | 90 |
| 36 | 1,000 | 10.6 | 91 |

¹ Galvanic corrosion apparent on the end of coupon where metal contact was made.

As evidenced by these tests, excellent protection was afforded even under the influence of severe temperature conditions.

It is obvious from an examination of the tests and examples set out hereinabove that the film-forming properties of the corrosion inhibitor provided by Component A reacted with Component B, e.g. a carboxylic acid, and particularly when supplemented by the inhibitor Component D, give most surprisingly valuable results. The practice of the invention has been shown to be highly successful when the corrosive fluid is any one of water, brine, or kerosene-brine mixtures. It has been shown that the presence of a bactericide which is miscible with the other components of the invention is in most instances a wise choice.

It has been shown that the invention is successful when practiced by a prebatch treatment or by periodically adding small amounts of the corrosion inhibitor to the corrosive liquid being stored or transferred or in most instances when both a batch pretreatment is performed followed by periodic additions to the liquid itself.

It has been shown that at least about 5%, up to 35%, and preferably between about 7% and about 15% of a water-miscible alcohol is recommended to be present for ready dispersion and stability.

The tests show that the preferred composition of the invention is a water-soluble and brine-dispersible film-forming corrosion inhibitor particularly adapted for downhole use. It has been found to provide a persistent film which will insure heretofore most unusual protection, calculated to be about 98% protection against $H_2S$ saturated oil-brine systems which may also contain $CO_2$ and organic acids.

The method of the invention has been shown to have special application for use in inhibitor squeeze treatment of gas wells where the fluid is objectionably corrosive. It is also adaptable for use in fresh water wells as well as in brine wells. In squeeze operations, where both corrosion and scale problems exist, the composition of the invention in its preferred form at a concentration up to 50,000 parts per million, usually about 5% by volume in water, is highly effective. The practice of the invention may consist of intermittent or periodic treatment and has extensive value by injection into input wells of unit production plans where corrosion exists along with the formation of scale and/or a bacteria problem.

The composition of the invention has displayed unusual and unique corrosion properties because of its strong persistent film which forms tenaciously on metal. It lends itself to the slug treatment because of its lasting protection. It has been shown that subsequent treatments following a batch treatment which are no more frequent than once a month are quite adequate in most corrosion situations. Most common bactericides and scale inhibitors are miscible with and blend very well with the other corrosion inhibitor compositions.

In the practice of the invention, it is sometimes more convenient to obtain Component A already dispersed in a hydrocarbon solvent and/or already mixed with a water and selected acid. The alcohol and/or surfactant already mixed in the vehicle has been found convenient. Similarly Component D may be admixed as an aqueous solution. It is both water-soluble and brine dispersible.

What is claimed is:

1. A composition for the inhibition of corrosion of metal contacted by a corrosive fluid consisting essentially of:
(I) the acid salt formed by reacting about 1 to about 50 percent by weight of the reaction product prepared by reacting at a temperature between about 300 and 550° F. a mixture of (a) between about 20% and about 60% of a carboxylic acid selected from the class of fatty acids and rosin acids having between about 10 and 24 carbon atoms per molecule, (b) between about 8% and 40% of a polymerized acid consisting essentially of dimerized unsaturated monocarboxylic fatty acid having between about 10 and about 24 carbon atoms per repeating unit, (c) between about 7% and about 36% of a reaction mixture comprising a partial ester formed by reacting at about esterification temperature a mixture consisting of between 0.6 and 1.4 molar ratio of each of (1) a polyhydroxy compound selected from the class consisting of alkylene glycols having from 2 to 5 carbon atoms per molecule and glycerol and (2) a polymerized monocarboxylic acid consisting essentially of dimerized unsaturated fatty acids having from about 10 to about 24 carbon atoms per repeating unit, until esterification has proceeded to between about 45% and 65% of completion and unreacted polyhydroxy compounds and acid and (d) between about 16% and about 30% aminoethylethanolamine with a water-soluble inorganic or $C_1$ to $C_6$ carboxylic acid and mixtures thereof having a solubility of at least about 1 gram per 100 grams of brine or water at ambient temperatures, in an amount to make a system having a pH of from about 5.5 to about 7.5;

(II) a liquid vehicle consisting of at least one of water, an alcohol, or a liquid hydrocarbon; and (III) when water or an alcohol is the vehicle about 0.2 to about 6.0 percent by weight of a surfactant having a hydrophile-lipophile balance of about 8 to about 18.

2. The composition of claim 1 wherein said inorganic or $C_1$ to $C_6$ carboxylic acid is present in an amount ranging from about 0.1 to about 5 percent.

3. The composition of claim 2 wherein the water soluble acid is a carboxylic acid.

4. The composition of claim 1 including in addition an effective amount of an imidazoline corrosion inhibitor, in an amount up to the amount of said acid salt, wherein the combined total weight of said acid salt and said imidazoline inhibitor is not substantially in excess of 50 percent by weight of the composition.

5. The composition of claim 4 including in addition nitrilotrimethylenephosphonic acid.

6. A composition for the inhibition of corrosion of metal contacted by a corrosive fluid containing $H_2S$, $CO_2$, and/or an organic acid consisting essentially of:

(I) an acid salt formed by reacting from about 1 to about 25 percent by weight of the reaction product prepared by reacting at a temperature between 300 and 550° F. a mixture of (a) between about 20% and about 60% of a carboxylic acid selected from the class of fatty acids and rosin acids having between about 10 and 24 carbon atoms per molecule, (b) between about 8% and 40% of a polymerized acid consisting essentially of dimerized unsaturated monocarboxylic fatty acid having between about 10 and about 24 carbon atoms per repeating unit, (c) between about 7% and about 36% of a reaction mixture comprising a partial ester formed by reacting at about esterification temperature a mixture consisting of between a 0.6 and 1.4 molar ratio of each of (1) a polyhydroxy compound selected from the class consisting of alkylene-glycols having from 2 to 5 carbon atoms per molecule and glycerol and (2) a polymerized monocarboxylic acid consisting essentially of dimerized unsaturated fatty acids having from about 10 to about 24 carbon atoms per repeating unit until esterification has proceeded to between about 45% and 65% of completion and unreacted polyhydroxy compounds and acid and (d) between about 16% and about 30% aminoethylethanolamine with a water-soluble carboxylic acid consisting of at least one of a $C_1$ to $C_6$ carboxylic acid having a solubility of at least 1 gram per 100 grams of water in an amount sufficient to provide a pH ranging from about 5.5 to about 7.5;

(II) a liquid vehicle selected from the class consisting of at least one of water, an alcohol, or a liquid hydrocarbon;

(III) an imidazoline inhibitor 1 to about 25 percent;

(IV) from about 0.2 to about 6.0 percent by weight of a surfactant when water or alcohol is the liquid vehicle, said surfactant having a hydrophile-lipophile balance of about 8 to about 18.

7. A composition consisting essentially of as percent by weight:

(I) the acid salt formed by reacting about 12.5 percent of the reaction product prepared by reacting at a temperature between 300 and 550° F. a mixture of (a) between about 20% and about 60% of a carboxylic acid selected from the class of fatty acids and rosin acids having between about 10 and 24 carbon atoms per molecule, (b) between about 8% and 40% of a polymerized acid consisting essentially of dimerized unsaturated monocarboxylic fatty acid having between about 10 and about 24 carbon atoms per repeating unit, (c) between about 7% and about 36% of a reaction mixture comprising a partial ester formed by reacting at about esterification temperature a mixture consisting of between a 0.6 and 1.4 molar ratio of each of (1) a polyhydroxy compound selected from the class consisting of alkylene glycols having from 2 to 5 carbon atoms per molecule and glycerol and (2) a polymerized monocarboxylic acid consisting essentially of dimerized unsaturated fatty acids having from about 10 to about 24 carbon atoms per repeating unit until esterification has proceeded to between about 45% and 65% of completion and unreacted polyhydroxy compounds and acid and (d) between about 16% and about 30% aminoethylethanolamine with about 3 percent propionic acid;

(II) about 43 percent water;

(III) about 12.5 percent of an imidazoline inhibitor;

(IV) about 25 percent isopropyl alcohol; and (V) about 4 percent of an alkyl phenol ether of polyethylene glycol having a hydrophile-lipophile balance of about 8 to about 18.

8. A method of inhibiting corrosion of metal due to contact with a corrosive fluid containing at least one of $H_2S$ or $CO_2$ as a corrosive ingredient which comprises contacting said metal with an effective amount of the composition of claim 1 to provide an inhibiting film thereon.

9. The method as defined in claim 8 wherein at least about 10 parts by weight of said composition is admixed with one million parts of said corrosive fluid.

10. A method of inhibiting the corrosion of metal due to contact with a corrosive fluid containing at least one of $H_2S$ or $CO_2$ as a corrosive ingredient at an elevated temperature of at least about 300° C. which comprises treating the surface of said metal with the composition defined in claim 1.

11. The method as defined in claim 10 wherein the composition includes in addition an imidazoline corrosion inhibitor in an amount up to the amount of said acid salt, wherein the total amount of said acid salt and said imidazoline is not substantially in excess of 50 percent by weight of the composition.

12. A method for inhibiting the corrosion of metal which comes in contact with a corrosive fluid containing at least one of $H_2S$ or $CO_2$ as corrosive ingredient which comprises contacting said metal with an effective amount of the composition of claim 6 to provide an inhibiting film thereon.

13. The method as defined in claim 12 wherein the inhibitor composition includes in addition and effective amount of a bactericide.

14. The method as defined in claim 12 wherein the inhibitor composition includes in addition an effective amount of a scale inhibitor.

15. The method as defined in claim 12 wherein the inhibitor composition is dispersed in the corrosive fluid in an amount of at least about 10 parts per million.

16. The method as defined in claim 12 wherein the metal is a metal part which is contacted by a corrosive fluid produced in a well which penetrates a subterranean formation.

References Cited

UNITED STATES PATENTS 3,378,488  4/1968  Nimerick _____ 252—8.55
2,882,227  4/1959  Lindberg _____ 252—8.55

HERBERT B. GUYNN, Primary Examiner

U.S. Cl. X.R.

21—2.5, 2.7; 166—279, 310; 252—389, 392, 396